United States Patent
Hwang

[11] Patent Number: 5,559,698
[45] Date of Patent: Sep. 24, 1996

[54] SYSTEM FOR DYNAMICALLY ADJUSTING THE TOE ANGLE OF VEHICLE WHEELS

[75] Inventor: Insoo Hwang, Kyungsangnam-do, Rep. of Korea

[73] Assignee: Hyundai Motor Company, Jongro-ku, Rep. of Korea

[21] Appl. No.: 284,974

[22] Filed: Aug. 4, 1994

[30] Foreign Application Priority Data

Aug. 6, 1993 [KR] Rep. of Korea .................... 93-15315

[51] Int. Cl.⁶ .................................................. B62D 6/00
[52] U.S. Cl. .................... 364/424.05; 180/197; 180/408; 280/99; 364/426.03
[58] Field of Search ................. 364/424.01, 424.05, 364/426.01, 426.02, 426.03; 33/286, 288; 180/140, 132, 197; 280/91

[56] References Cited

U.S. PATENT DOCUMENTS

| | | | |
|---|---|---|---|
| 4,192,074 | 3/1980 | Chang | 33/288 X |
| 4,786,066 | 11/1988 | Kondo et al. | 280/91 |
| 5,027,275 | 6/1991 | Sakamoto et al. | 364/424.05 |
| 5,088,040 | 2/1992 | Matsuda et al. | 364/424.05 |
| 5,141,071 | 8/1992 | Edahiro et al. | 180/197 |
| 5,143,400 | 9/1992 | Miller et al. | 280/91 |
| 5,222,568 | 6/1993 | Higasa et al. | 180/65.5 |
| 5,438,515 | 8/1995 | Miichi et al. | 364/424.05 |
| 5,488,555 | 1/1996 | Asgari et al. | 364/424.05 |

*Primary Examiner*—Collin W. Park
*Attorney, Agent, or Firm*—Finnegan, Henderson, Farabow, Garrett and Dunner, L.L.P.

[57] ABSTRACT

The invention is a system and method for dynamically adjusting the positions of the front and rear wheels of an automotive vehicle comprising first and second accelerometers disposed to sense the acceleration of front and rear wheels and to generate first and second electrical signals representative of the magnitude of such acceleration, a speed sensor disposed to sense the speed of the vehicle and to generate a third electrical signal representative of such speed, a steering dispenser disposed to sense the position of the steering mechanism of the vehicle for generating a fourth electrical signal representative of vehicle turning and direction thereof, a plurality of actuators at least one being connected to each wheel to selectively adjust the toe angle of the wheel and control means connected to the actuators responsive to the first, second, third and fourth electrical signals for controlling the actuators to dynamically adjust the toe angle of each wheel to a position optimum for vehicle speed and driving condition.

10 Claims, 2 Drawing Sheets

SYSTEM FOR DYNAMICALLY ADJUSTING THE TOE ANGLE OF VEHICLE WHEELS

BACKGROUND OF THE INVENTION

1. Field of the Invention

The present invention relates to a system and a method for dynamically adjusting the position of wheels of an automotive vehicle. More particularly, the present invention relates to a system and a method for dynamically adjusting the toe angle of wheels of an automotive vehicle in response to the driving conditions of the wheels and the vehicle speed.

2. Description of the Art

When an automotive vehicle is turning either by travel along a curved road or during cornering, driving safety would be enhanced if the rear wheels could be moved in or out of phase with the direction of the steering front wheels. It is known, for example, that when a vehicle turns while at low speed, the diameter of the path taken by the rear wheels is minimized if the rear wheels are adjusted to a directional orientation opposite those taken by the steering front wheels. Additionally, at high speed, better traction is achieved during turns if the rear wheels are adjusted to assume the same directional orientation as the front wheels.

The directional orientation of the wheels of automotive vehicles, other than by steering, is conventionally determined by the toe angle. The toe angle is normally controlled by the running speed of the automotive vehicle and the preset toe-in. Other operating conditions of the vehicle conventionally have no effect on the toe angle of the wheels. Thus, the wheels of an automotive vehicle do not assume optimum positions for various driving conditions, such as turning or driving the surface of the road is wet or is iced over.

The present invention provides a system for adjusting the position of automotive vehicle wheels and a method for controlling the position of the automotive vehicle wheels that can ensure safe driving by adjusting the front and rear wheel positions in dynamic response to the running speed and operating conditions of the automotive vehicle. Additional advantages of the invention are set forth in part in the description which follows, and in part will be obvious from the description, or may learned by practice of the invention.

SUMMARY OF THE INVENTION

The advantages of the invention may be obtained by means of the combinations particularly pointed out in the appended claims. The invention includes a system for dynamically adjusting the positions of the front and rear wheels of an automotive vehicle. The system comprises a first accelerometer disposed to sense acceleration of the front wheels and to generate a first electrical signal representative of the magnitude of such acceleration; a second accelerometer disposed to sense acceleration of the rear wheels and to generate a second electrical signal representative of the magnitude of such acceleration; a speed sensor disposed to sense the speed of the vehicle and to generate a third electrical signal representative of such speed; means for sensing the position of the steering mechanism of the vehicle and for generating a fourth electrical signal representative of vehicle turning and the direction thereof; a plurality of actuators, at least one being connected to each wheel to selectively adjust the toe angle of the wheel; and control means connected to the actuators and responsive to the first, second, third and fourth electrical signals for controlling the actuators to dynamically adjust the toe angle of each wheel to a position optimum for the vehicle's speed and driving condition.

In another aspect of the invention, a method for dynamically adjusting the positions of the front and rear wheels of an automotive vehicle comprises the steps of continually monitoring the acceleration of the front and the rear wheels, the speed of the vehicle and the position of the vehicle steering mechanism; determining high or low vehicle speed by comparing the sensed vehicle speed to a predetermined speed value; determining wheel slippage by comparing the acceleration magnitude of the front wheels against a comparative value equal to the rear wheel acceleration magnitude plus a constant and against a predetermined acceleration value; determining vehicle turn status and direction by the sensed position of the steering mechanism; when the vehicle is in a low speed turn, selectively adjusting the toe angle of the front and rear wheels into opposite orientations to optimize vehicle turning radius; and when the vehicle is in a high speed turn and wheel slippage is sensed, determining the direction of wheel slippage based upon turn direction and selectively adjusting the toe angles of front and rear wheels to orientations in opposition to the direction of wheel slippage.

In the method of the invention, preferably, the toe angles of the front wheels are adjusted in opposition to sensed slippage when the acceleration magnitude of the front wheels is greater than the comparative value of acceleration, the toe angles of the rear wheels are adjusted in opposition to sensed slippage when the acceleration magnitude of the front wheels is less than the comparative value of acceleration, and the toe angles of all wheels are adjusted in opposition to sensed slippage when the acceleration magnitude of the front wheels and the comparative value of acceleration are equal to each other and greater than the predetermined acceleration value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PRESENT INVENTION

The present invention will now be described in detail with reference to the accompanying drawings.

Figure 1:
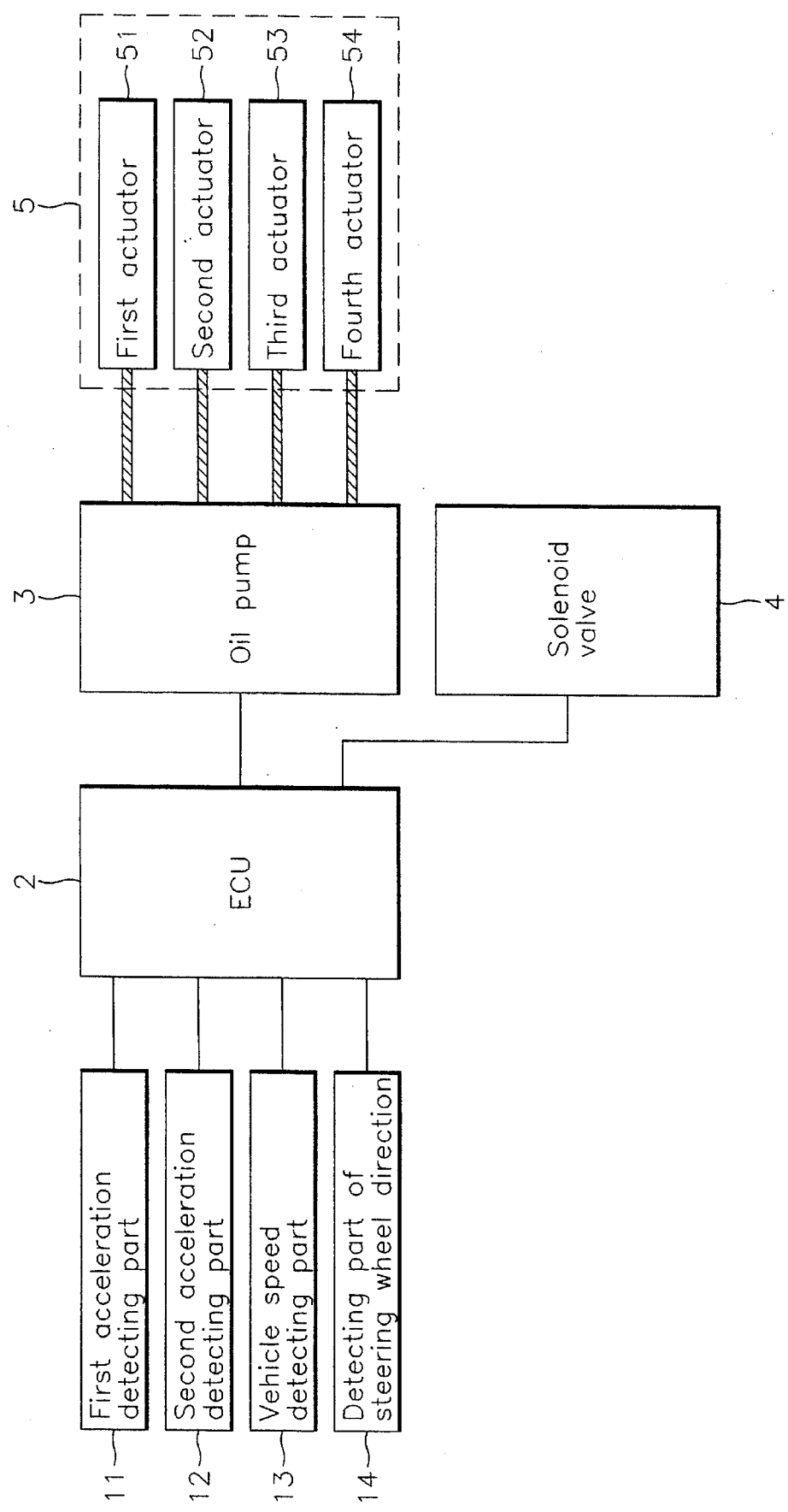
FIG. 1 is a block diagram of a system for adjusting the position of automotive vehicle wheels in accordance with a preferred embodiment of this invention.

The system for dynamically adjusting the positions of automotive vehicle wheels includes first and second accelerometers respectively disposed to sense acceleration of the front and rear wheels of the vehicle and to generate respective first and second electrical signals representative of the magnitude the acceleration. The embodiment of FIG. 1 depicts in block form first and second acceleration detecting parts 11 and 12 which represent any number of known accelerometers or other devices that detect acceleration and generate an electric signal representative of the magnitude of the acceleration. The acceleration detectors 11, 12 are respectively disposed to detect acceleration acting on the front wheels and on the rear wheels and each detector generates a corresponding signal.

The system of the invention also includes a speed sensor for sensing vehicle speed and generating an third electrical signal representative thereof. The car speed detecting part 13 depicted in FIG. 1 represents known apparatus that detect the speed of the vehicle and generate a corresponding signal.

The system further includes means for sensing the position of the steering mechanism and for generating a fourth electrical signal representative of the vehicle turning state and the direction thereof. One skilled in the art can identify numerous apparatus which may be used to sense whether the steering wheel is in a position other than straight and center and in what direction (right or left) the steering wheel was rotated from straight and center and to generate an electrical signal representative thereof. The steering wheel detecting part 14 depicted in FIG. 1 represents such known devices.

The system of the invention also includes a plurality of actuators, at least one being connected to each wheel to selectively adjust the toe angle of the wheel. Preferably, as depicted in FIG. 1, first, second, third and fourth actuators 51, 52, 53 and 54, are respectively connected to each of the front and rear wheels to selectively adjust the toe angle of each respective wheel. Preferably, actuators 51–54 are hydraulically operated and controlled by means of oil pump connected to each actuator. The oil pump 3 receives controlling signals from electronic control unit 2 (to be discussed below) causing each actuator to independently adjust the toe angle of its respective wheel. Preferably, the oil pressure in pump 3, and therefore in the actuators 51–54, is controlled by solenoid valve 4 connected to electronic control unit 2.

Finally, the system of the invention includes control means connected to the actuators and responsive to the first, second, third and fourth electrical signals for controlling the actuator to dynamically adjust the toe angle of each wheel to a position optimum for the vehicle speed and driving condition. The electronic control unit 2 ("ECU") schematically depicted in FIG. 1 represents any number of known microprocessors which can be programmed to respond to the first, second, third and fourth electrical signals representative of the acceleration of the front and rear wheels, the vehicle speed and vehicle steering wheel 20 position and to generate a signal controlling the actuators to dynamically adjust the toe angle of each wheel to positions that are optimum for the vehicle speed and driving condition as represented by the first through fourth electrical signals. As noted above, the ECU 2 may also be programmed to control the solenoid valve 4 to maintain a desired pressure in oil pump 3.

Figure 2:
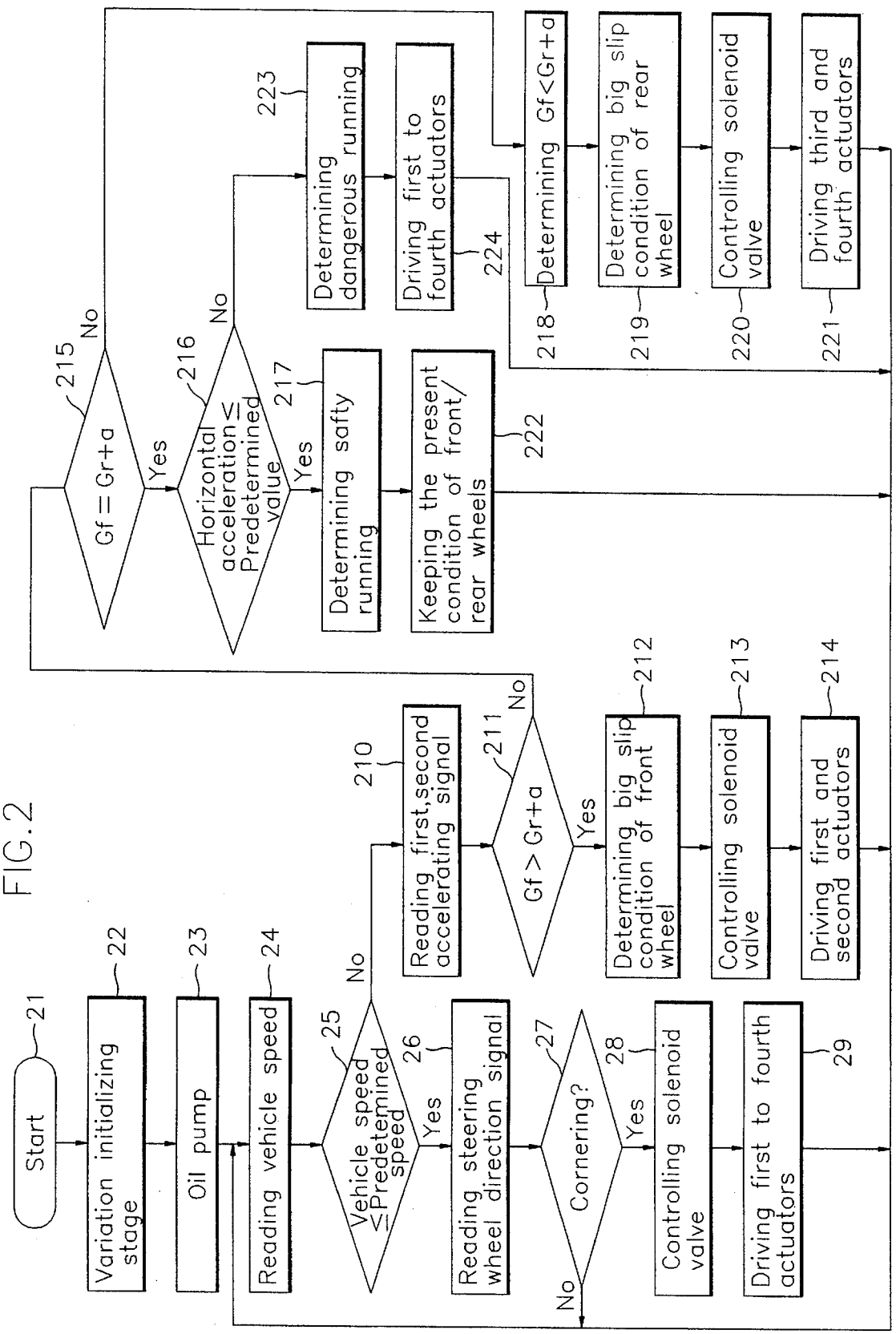
FIG. 2 illustrates the steps in the operation of the system for adjusting the position of automotive vehicle wheels in accordance with the preferred embodiment of this invention.

In operation, when the driver turns power on to a vehicle, ECU 2 initializes memory variations stored in the inner memory, as indicated at S22 in Flow Chart depicted in FIG. 2. ECU 2 also energizes oil pump 3 to ensure that hydraulic pressure is available for adjusting wheel toe angle during operation of the system in accordance with the method of the invention.

The method for dynamically adjusting the positions of the front and rear wheels of an automotive vehicle comprises the steps of continually monitoring the acceleration of the front and rear wheels, the speed of the vehicle and the position of the vehicle steering mechanism and of comparing the vehicle speed to a predetermined speed value. As depicted in FIG. 1, ECU 2 is in continual electrical communication with acceleration detectors 11 and 12, the vehicle speed detector 13 and steering wheel position detector 14 for continually monitoring acceleration, speed and turning.

ECU 2 receives the third electrical signal from vehicle speed detecting part 13 and determines the speed of the vehicle (S24). This vehicle speed is compared with a predetermined vehicle speed to determine whether the vehicle is operating at high, medium or low speed (S25).

The method of the invention also includes determining vehicle turn status and direction by the sensed position of the steering mechanism. This is accomplished by ECU 2.

The method of the invention further includes determining wheel slippage by comparing the acceleration magnitude of the front wheels against a comparative value equal to the rear wheel acceleration magnitude plus a constant and against a predetermined acceleration value. As depicted in FIG. 2, when vehicle speed is high, that is, greater than the predetermined speed (S25), ECU 2 reads the first and second electrical signals from first and second accelerometers 11, 12 to determine the magnitude of the acceleration on the front wheels (Gf) and on the rear wheels (Gr) acting in a horizontal direction. The direction of horizontal slippage is outside the direction of turn as determined by the vehicle turn status.

When the vehicle is at low speed and in a turn, the method of the invention further comprises the step of selectively adjusting the toe angles of front and rear wheels into opposite orientations to optimize the low speed turning radius of the vehicle. As depicted in FIG. 2, when the ECU 2 determines that the vehicle has a low speed, that is less than or equal to the predetermined speed, the vehicle steering direction signal is evaluated (S26) to determine whether the vehicle is traveling straight or is in a turn such as on a curved road or when cornering and whether the direction of the turn is left or right. If ECU 2 determines that the vehicle is turning, either by travel on a curved road or by cornering, a signal is sent to pump 3 (S28) to provide hydraulic pressure to the first, second, third and fourth actuators 51–54 so that the toe angles of the rear wheels are disposed in a directional orientation opposite that of the front wheels as determined by the direction of the turn. By disposing the front and rear wheels in opposite phases during a low speed turn, the turn radius is minimized.

In accordance with the method invention, when the vehicle is in a high speed turn, that is a speed greater than the predetermined speed value, the toe angle of the front and rear wheels are adjusted to orientations in opposition to the direction of wheel slippage. The ECU 2 determines (S211) whether front wheel acceleration Gf is greater than a comparative acceleration value equal to the rear wheel acceleration (Gr) plus a constant ("a") of a predetermined magnitude. If acceleration Gf of the front wheels is greater than the comparative value (Gf>Gr+a), ECU 2 determines (S212) that the vehicle is moving in a direction contrary to that corresponding to the sensed steering mechanism position because the slippage of the front wheels is greater than that of the rear wheels. The ECU 2 then controls the position of the front wheels by operation of solenoid valve 4 and pump 3 driving first and second actuators 51, 52 to move the front wheels in the same direction as the turn indicated by the signal from the steering mechanism sensor. The toe angle of the front wheel which is on the inside of the turn is moved in an outward or toe-out direction while the front wheel on the outside of the turn is moved in an inward or toe-in direction. Thus, the positions of the front wheels are adjusted to be in the same direction as the turn direction enhancing the power of the turn and resisting the tendency of the vehicle body to deviate from the turn direction.

If, as sensed by ECU 2, acceleration on the front wheels (Gf) is not greater than the comparative acceleration value (Gr+a), ECU 2 determines (S215) whether the front wheel acceleration Gf is equal to the comparative value. If it is the same as the comparative value (Gf=Gr+a), ECU 2 determines (S216) whether the front wheel acceleration (Gf) and the comparative acceleration value (Gr+a) is less than or equal to a predetermined acceleration value. If the acceleration of the front wheels (Gf) and the comparative acceleration value (Gr+a) are equal to each other and less than or equal to the predetermined acceleration value, ECU 2 determines (S217) the vehicle is being safely operated and does not require adjustment to the wheels.

If, however, the front wheel acceleration (Gf) and the comparative acceleration value (Gr+a) are greater than the predetermined acceleration value, ECU 2 determines (S223) that the vehicle is slipping at both the front and rear wheels. In this event, ECU 2 controls the solenoid valve 4 and oil pump 3 to actuate first, second, third and fourth actuators 51–54. Actuators on the wheels on the inside of the turn, as sensed by the steering mechanism sensor, are adjusted to a toe-out position while actuators on the two wheels on the outside of the turn are adjusted into a toe-in direction. In this way ECU 2 adjusts the position of the front and rear wheels to a safer condition.

If the acceleration of the front wheels (Gf) is not the same as the comparative acceleration value (Gr+a), ECU 2 determines (S218) if the front wheel acceleration is less than the comparative acceleration value (Gr+a). If it is, ECU 2 determines (S219) that the slippage of the rear wheels is greater than the front wheels. In that event, ECU 2 controls (S220) the operation of solenoid valve 4 to adjust the magnitude of hydraulic pressure to maintain a toe-out state in the wheels disposed in the inside of the turn and to obtain a toe-in state of the wheels disposed on the outside of the turn. In particular, when the rear wheels are slipping, third and fourth actuators 53, 54 move rear wheels in the direction of the turn, that is, the rear wheel inside the turn is moved into a toe-out direction and the rear wheel outside the turn is moved into a toe-in direction. If the position of the rear wheels is adjusted to have the same direction as the direction of turn, power is increased and the vehicle body does not deviate from the turn, thus contributing to the safe driving.

In the inventive embodiments described in the specification, the speed and driving conditions are determined and used to correct or adjust the position of the vehicle wheels to achieve a safe operation. As in the case of cornering or turning at low speed where there is little probability of an accident, the position of the vehicle wheels is adjusted to minimize the turn diameter. The present invention also provides a system which adjusts the position of vehicle wheels to facilitate cornering and to reduce the possibility of slippage due to the condition of the road.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. In an automotive vehicle having front and rear wheels and steering wheel, a system for dynamically adjusting the toe angle positions of the front and rear wheels comprising:

a first accelerometer disposed to sense acceleration of the front wheels and to generate a first electrical signal representative of the sensed acceleration;

a second accelerometer disposed to sense acceleration of the rear wheels and to generate a second electrical signal representative of the sensed acceleration;

a speed sensor disposed to sense speed of the vehicle and to generate a third electrical signal representative of the sensed speed;

means for sensing the position of the steering wheel of the vehicle and for generating a fourth electrical signal representative of the sensed steering wheel position;

a plurality of actuators, at least one being connected to each of the front and rear wheels to selectively adjust the toe angle of each of the front and rear wheels; and control means connected to the actuators and responsive to the first, second, third and fourth electrical signals for controlling the actuators to dynamically adjust the toe angle of each of the front and rear wheels to a position determined by the control means to be optimum for the vehicle operating at the sensed acceleration, speed and steering wheel position.

2. The system of claim 1 wherein the actuators are hydraulically operated.

3. The system of claim 2 further comprising an oil pump hydraulically connected to each actuator and electrically connected to the control means, the pump generating hydraulic pressure for operating the actuators.

4. The system of claim 3 also including a solenoid valve electrically controlled by the control means and disposed to control the hydraulic pressure generated by the oil pump.

5. In an automotive vehicle having front and rear wheels and a steering wheel, a method for dynamically adjusting the toe angle positions of the front and rear wheels comprising the steps of:

continually sensing acceleration of the front and the rear wheels, speed of the vehicle and the position of the vehicle steering wheel;

determining high or low vehicle speed by comparing the sensed vehicle speed to a predetermined speed value;

determining wheel slippage by comparing the acceleration of the front wheels against a comparative value equal to the rear wheel acceleration plus a constant and against a predetermined acceleration value;

determining vehicle turn status and direction by the sensed position of the steering wheel;

when the vehicle is in a low speed turn, selectively adjusting the toe angles of the front and rear wheels into opposite orientations to decrease the vehicle turning radius; and when the vehicle is in a high speed turn and wheel slippage is sensed, determining the direction of wheel slippage based upon turn direction and selectively adjusting the toe angles of front and rear wheels to orientations opposite to the direction of wheel slippage.

6. The method of claim 5 wherein the acceleration magnitudes, the vehicle speed and the steering mechanism position are represented by electrical signals.

7. The method of claim 5 wherein the steps of adjusting the toe angles include selectively varying hydraulic pressure of actuators connected to each wheel.

8. The method of claim 5 wherein the toe angles of the front wheels are adjusted in opposite direction to sensed slippage when the acceleration of the front wheels is greater than the comparative value of acceleration.

9. The method of claim 5 wherein the toe angles of the rear wheels are adjusted in opposite direction to sensed slippage when the acceleration of the front wheels is less than the comparative value of acceleration.

10. The method of claim 5 wherein the toe angles of all wheels are adjusted in opposite direction to sensed slippage when the acceleration of the front wheels and the comparative value of acceleration are equal to each other and greater than the predetermined acceleration value.

* * * * *